United States Patent [19]

Koslin

[11] Patent Number: 4,943,239

[45] Date of Patent: Jul. 24, 1990

[54] TEST ANSWER AND SCORE SHEET DEVICE

[75] Inventor: Betram L. Koslin, Yorktown Heights, N.Y.

[73] Assignee: Touchstone Applied Science Associates, Inc., Brewster, N.Y.

[21] Appl. No.: 347,998

[22] Filed: May 5, 1989

[51] Int. Cl.⁵ .................................................. G09B 3/08
[52] U.S. Cl. ...................................... 434/353; 434/363
[58] Field of Search ................ 434/353, 363, 364, 359

[56] References Cited

U.S. PATENT DOCUMENTS

| | | | |
|---|---|---|---|
| 1,883,199 | 10/1932 | Wiley | 434/354 |
| 1,883,775 | 10/1932 | Finkenbinder | 434/353 X |
| 2,977,689 | 4/1961 | Rugland et al. | 434/353 |
| 3,643,348 | 2/1972 | Azure, Jr. | 434/353 |
| 4,175,339 | 11/1979 | Jones | 434/326 |

Primary Examiner—William H. Grieb
Attorney, Agent, or Firm—Leo Zucker

[57] ABSTRACT

An answer recording and score sheet device includes a markable sheet arrangement with at least one surface that has answer mark guide indicia. The guide indicia define sets of first positions at which marks can be selectively made by a respondent in response to corresponding questions. The sheet arrangement also has a surface on which a number of discriminable flag indicia are formed in a determined relation with respect to the first positions. The flag indicia serve to convey correct responses in accordance with a given test form or answer key, and are of such form as to enable rapid manual or electronic grading of the chosen responses.

23 Claims, 2 Drawing Sheets

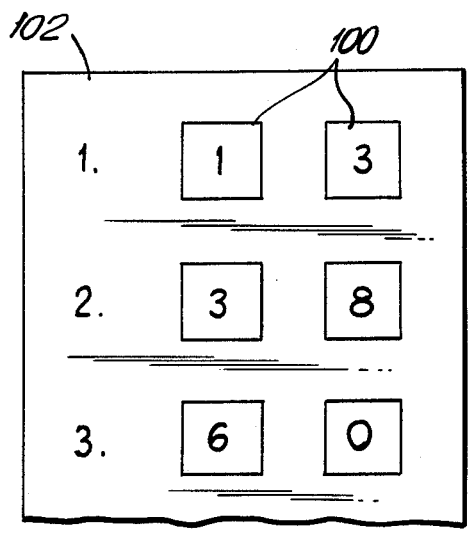
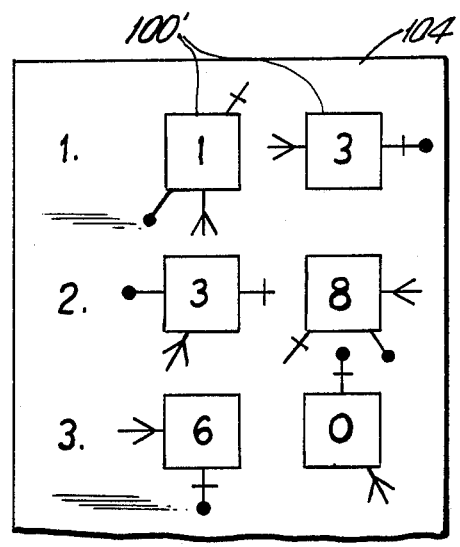
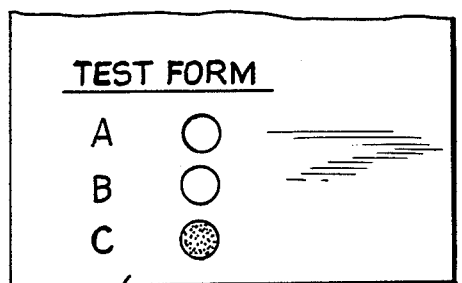
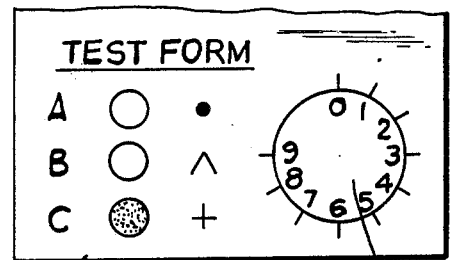
FIG.3              FIG.4
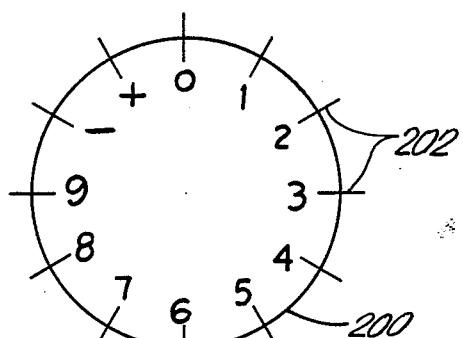
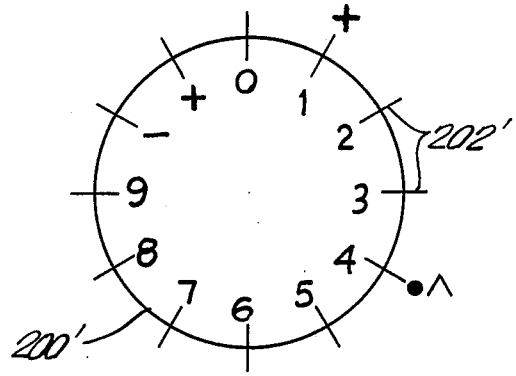
FIG.5              FIG.6
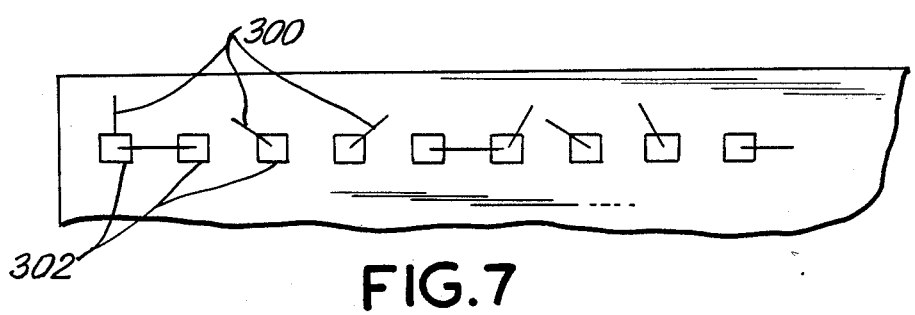
FIG.7

TEST ANSWER AND SCORE SHEET DEVICE

BACKGROUND OF THE INVENTION

1. Field of the Invention

The present invention relates generally to test answer and scoring sheets, and particularly to a test answer/score sheet arrangement in which answer marks made in defined areas on a top sheet, are transferred onto corresponding defined areas on a bottom sheet that is hidden from view of the test taker.

2. Description of the Known Art

Test answer and scoring sheet configurations are generally known, wherein a mark is placed within a defined space on a top sheet to indicate a selected answer to a numbered question, and the mark is transferred onto a correspondingly defined region on the surface of a hidden bottom sheet.

For example, U.S. Pat. No. 2,977,689 issued Apr. 4, 1961, shows a two-layer answer/score sheet arrangement in which markings made in correct stations on a top sheet, are transferred in full onto a bottom sheet through pressure sensitive material. Incorrect markings are transferred only partially through a relatively narrow band of the pressure sensitive material. The test scorer, who alone is permitted to view the bottom sheet, then determines from the completeness of the mark transfer if the a correct station was marked on the top sheet as one of a number of possible choices for each question.

U.S. Pat. No. 1,883,199 issued Oct. 18, 1932, discloses the use of lines on a bottom sheet to connect all the "correct" lettered circles of each of a number of rows of lettered circles, to one another. When viewing the bottom sheet, the test scorer then can determine if the correct circle was marked on the top sheet as one of five possible choices a thru e for each question.

The known test answer/score sheet arrangements are, however, limited to those applications where only one answer key is being used. That is, within each group of stations, circles or other answer mark transfer areas on the bottom sheet, only one of the areas is defined to represent a correct answer to the corresponding question. If it is desired to change the answer key, i.e., change the sequence of some or all of the correct choices for a series of test questions, then a new answer/score sheet combination must be printed so that the correct answers to each group of questions will be defined on the bottom sheet for proper grading by the test scorer. The printing and maintaining of many different answer/score sheets in order to implement different answer keys for various tests, becomes expensive and gives rise to the possibility that an answer/score sheet combination of the wrong answer key may be used inadvertently, when grading a particular examination.

SUMMARY OF THE INVENTION

An object of the invention is to overcome the above and other shortcomings of the known test answer and score sheet arrangements.

Another object of the invention is to provide a single answer recording and score sheet device with which more than one test form or answer key can be defined for a series of test questions.

A further object of the invention is to provide an answer and score sheet device that permits scoring of a test according to one of a number of different answer keys, wherein correct answers are signaled by flags representing the different keys.

Another object of the invention is to provide an answer/score sheet device that permits grading either by hand or by electronic processing, or both, by the use of identifiable flag indicia at determined positions on a sheet surface.

According to the invention, an answer and score sheet device includes markable sheet means having at least one surface with answer mark guide indicia for defining first positions at which marks can be made selectively by a respondent in response to corresponding questions. The sheet means also has a surface on which a number of discriminable flag indicia are formed at certain second positions in determined orientations with respect to the first positions, each of the flag indicia corresponding to one of at least two different test forms. The formation of the flag indicia corresponds to correct responses to the questions in accordance with a selected test form.

The various features of novelty which characterize the invention are pointed out with particularity by the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

In the drawing:

FIG. 3 is a plan view of a second embodiment of a test answer and score sheet device according to the invention, showing a top sheet of the device;

FIG. 4 is a plan view of a hidden bottom sheet of the device of FIG. 3;

FIG. 5 shows a symbol on which numbers and signs as possible answers to a test question can marked by the test taker;

FIG. 6 shows a symbol corresponding to that of FIG. 5, but with the correct answer defined for each of three possible answer keys; and FIG. 7 is view of a top portion of a scannable answer sheet, showing a series of flag keys.

DETAILED DESCRIPTION OF THE INVENTION

Figure 1:
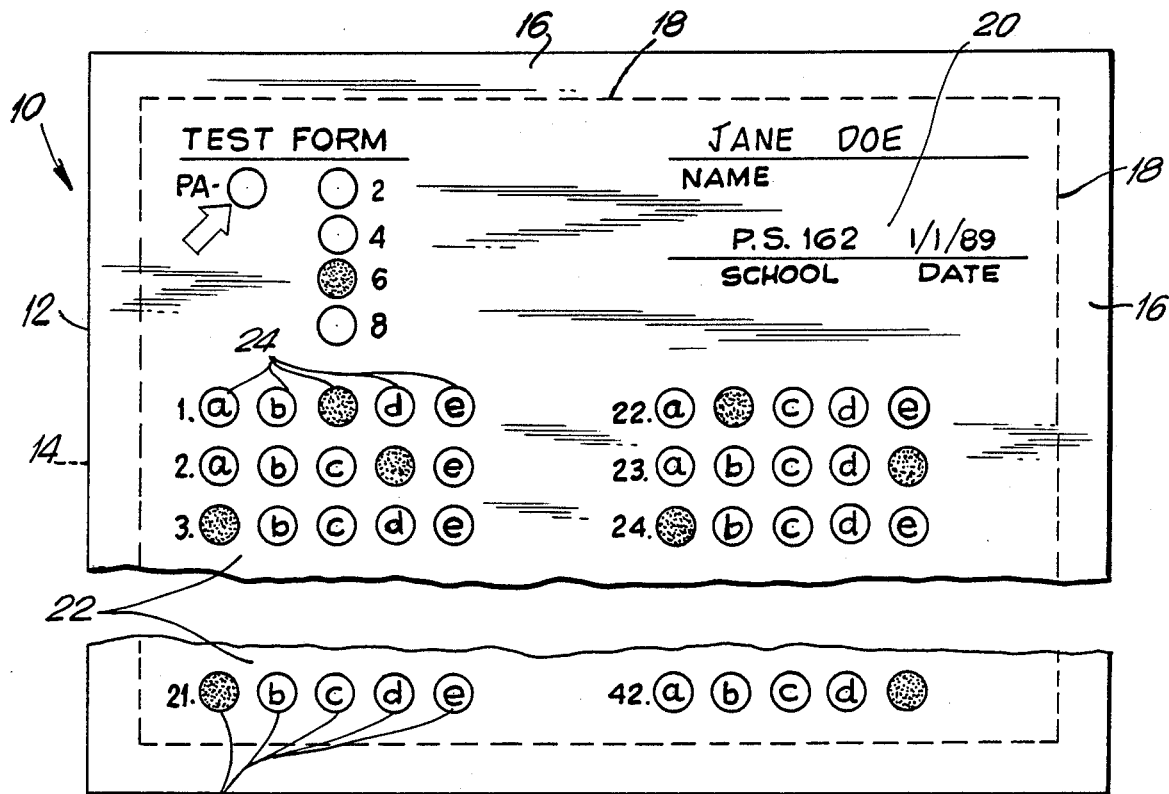
FIG. 1 is a plan view of a test answer and score sheet device according to the invention, showing a top sheet of the device.

FIG. 1 is a plan view of a test answer and score sheet device 10 according to the invention. The device 10 is used in conjunction with a test form (not shown) on which a series of numbered questions are printed with multiple choice answers lettered "a" through "e". Each time a person taking the test chooses an answer to a question, he or she makes a pencil mark in a correspondingly lettered circle.

Device 10 includes a top page or sheet 12, and a bottom page or sheet 14 (FIG. 2) that may be detachably fixed beneath the top sheet 12, hidden from view of the test taker. For example, sheet 14 may be adhered to sheet 12 along perforated tear strip borders 16. When the borders 16 are torn away along perforations 18, the bottom sheet 14 can be separated from top sheet 12 to enable scoring of the test, as explained below. Alternatively, the sheets 12, 14 simply can be edge-glued with an adhesive that permits separation of the sheets without tearing.

Top sheet 12 has a personal identification area 20 at which the test taker (e.g., a student) enters his or her name, school, the date of the examination and such other data as may be necessary for record keeping purposes. Before starting the examination, the student is informed of a test form number, for example, PA - "2", "4", "6" or "8", and the student marks a circle corresponding to the identified test form number under the heading "TEST FORM". The identified test form number represents which one out of four possible answer keys is to be used by the test grader when scoring the examination. In the illustrated embodiment, test form (answer key) PA-6 is designated.

The top sheet 12 also has a test answer marking region 22 on which the student marks a chosen answer to each of a series of numbered test questions. Specifically, answer mark guide indicia 24 in the form of circles lettered "a" through "e", define groups of areas in which answering marks can be made selectively by the student in response to the test questions. Each of the numbered test questions (not shown) is referenced to a like numbered group of five circles lettered "a" through "e". In the illustrated embodiment, the answering marks are made by pressing a pencil down on the chosen lettered circle for each question, and darkening the circle area.

Figure 2:
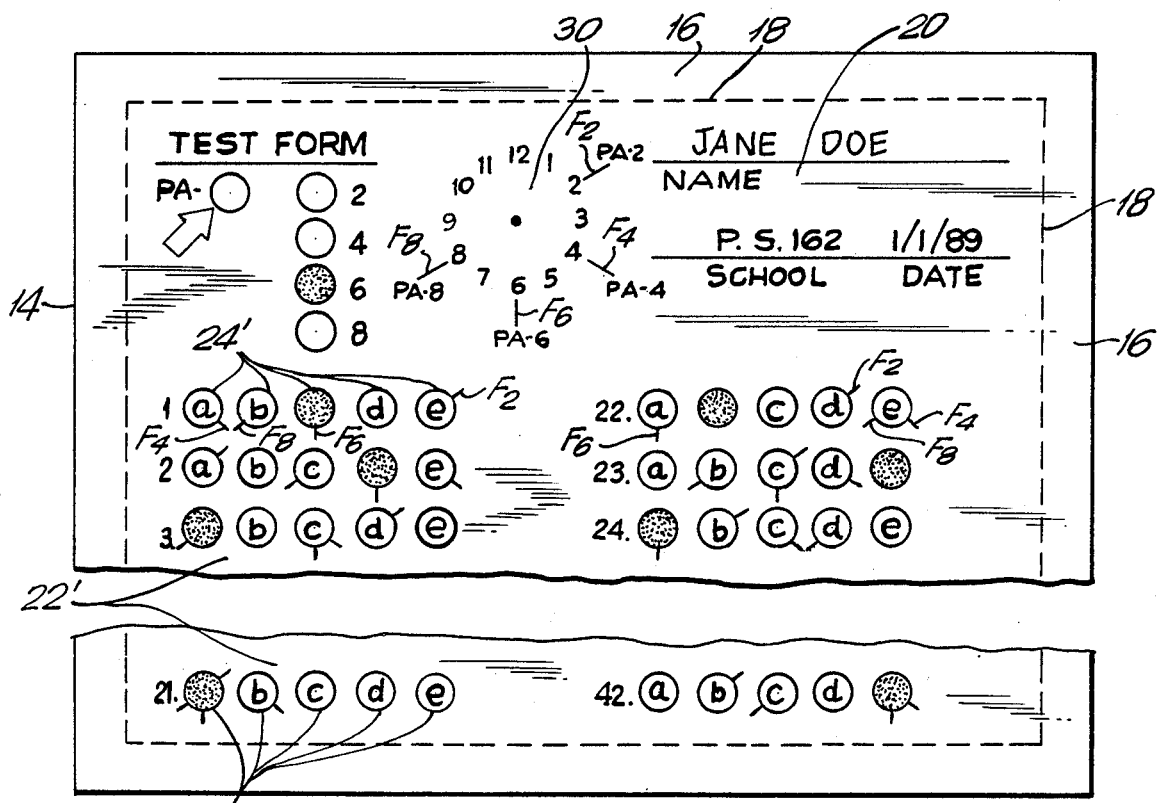
FIG. 2 is a plan view of a hidden bottom sheet of the device of FIG. 1.

FIG. 2 is a view of the top surface of the bottom sheet 14, showing the condition of sheet 14 after marks have been made in the defined areas on the top surface of top sheet 12, and the two sheets 12, 14 are detached from one another.

Suitable means such as a pressure sensitive carbon or other chemical marking transfer agent is provided between the top sheet 12 and the bottom sheet 14. For example, the bottom surface of the top sheet 12 may be coated with such a transfer agent, so that all writings and other markings made on the top surface of sheet 12 will become visible on the top surface of the bottom sheet 14.

As shown in FIG. 2, the student's name, school and the date appear in a personal identification area 20' of the sheet 14. Area 20' is in registration with the corresponding area 20 on top sheet 12 while the sheets 12, 14 remain attached to one another. Likewise, the test form or answer key number (PA-6) to be applied when grading the examination, is so marked under a corresponding "TEST FORM" heading on sheet 14.

Bottom sheet 14 also has a test answer mark region 22' in registration with the corresponding marking region 22 on top sheet 12. Guide indicia 24' in the form of circles lettered "a" through "e" are also in registration with the corresponding indicia 24 on top sheet 12, the indicia 24' defining groups of areas in which the answering marks made by the student are transferred while the sheets 12, 14 remain attached.

Four discriminable answer key flags F2, F4, F6 and F8 are printed adjacent certain ones of the lettered circles 24' of each numbered group of the circles 24', on the top surface of sheet 14. Each of the flags F2, F4, F6 and F8 represents a corresponding one of the test forms or answer keys PA-2, 4, 6 and 8, and is positioned adjacent that circle of each group which corresponds to a correct answer according to the test form represented by the flag.

In the illustrated embodiment, flag F6 is identified as the applicable flag by reference to a "clock" symbol 30 preprinted on sheet 14, next to the "TEST FORM" identification area as shown in FIG. 2. That is, for test form PA-6, the symbol 30 shows a pre-printed flag line that extends in the "6 o'clock" direction. Thus, correct answers for form PA-6 are signaled by the flag F6 which extends in the 6 o'clock direction from one of the lettered circles in each numbered group of circles printed on sheet 14.

A person scoring the examination then needs only to check if those lettered circles signaled by the flag F6 were marked by the student, to determine if correct answers were chosen. It can be seen from FIG. 2 that the student chose correct answers for questions numbered 1, 2, 21, 24 and 42. Incorrect answers were marked for questions 3, 22 and 23.

If test form PA-2 was identified by a marking on the sheet 14, the test scorer would refer to clock symbol 30 and see that a flag which extends in the "2 o'clock" direction, viz., flag F2, is the flag that signals which of the lettered circles corresponds to the correct answers according to test form PA-2.

It will be appreciated that a common lettered circle can be signaled or flagged as a correct answer for more than one test form. For example, the circle lettered "a" in group 21. at the bottom of FIG. 2, is clearly signaled as the correct answer for test forms PA-2, 6 and 8.

The present answer and score sheet device is not limited to the so-called multiple choice type of examination where a student marks one of several defined areas on an answer sheet to designate a chosen answer.

FIGS. 3 and 4 show a second embodiment wherein blank areas such as pairs of open squares 100 are pre-printed on a top sheet 102, and corresponding open areas are defined by pre-printed squares 100' on a bottom sheet 104. The squares 100' are in registration with the squares 100 on top sheet 102 when the two sheets 102, 104 are attached to one another and the top surface of bottom sheet 104 is hidden from the student's view.

As in the embodiment of FIGS. 1 and 2, a pressure sensitive agent is provided between the bottom of sheet 102 and the top of sheet 104 while the sheets are attached, so that writings made by the student on the visible surface of sheet 102 are transferred onto corresponding areas of the hidden (top) surface of sheet 104. Sheets 102, 104 may also have personal or student identification areas (not shown) as in the FIG. 1 embodiment.

The applicable test form or answer key is marked by the student under a "TEST FORM" heading, for example, at the bottom of the sheet 102 as shown in FIG. 3. Here, test form "C" is marked among three possible forms "A", "B" and "C".

Rather than simply placing a mark in a defined area on sheet 102 to designate a chosen answer to a correspondingly numbered question, the student actually writes his or her answer in the open squares 100. For example, if a math test is being given and the answer to question 1. is "13", the student enters a "1" in the first square after the number 1. on sheet 102, and then enters a "3" in the second square as shown at the top of FIG. 3. Likewise, after the student computes answers "38" and "60" for questions 2. and 3., he or she enters the numerals for each answer in the corresponding squares 100, as shown.

Three discriminable answer key flags in the form of symbols ".", " ^ ", and "+" are pre-printed adjacent each square 100' on the top surface of sheet 104. Each of the flags ".", " ^ ", and "+" represents a corresponding one of the test forms or answer keys A, B and C. By referring to the table under the "TEST FORM" heading at the bottom of sheet 104, the grader is informed that the flag or symbol "+" is to be used as a guide to determine whether or not a correct numeral was entered in each square by the student.

Next, the grader refers to a numeric encoding symbol 106 that is pre-printed next to the test form identification area on sheet 104, and sees that correct numerals to appear in each square 100' for a given test form are encoded by way of a line segment that extends in the "N" o'clock direction for numerals N=1, 2, 3, ... 9, and by a line segment that extends in the "12" o'clock direction for N=0.

Correct answers are then determined by combining the applicable test form symbol (here, a "+") with a directionally coded line segment extending from each square 100'. For example, the correct answer for question 1. is defined by those line segments that extend from the pair of squares 100' next to the number 1. on sheet 104, and have the "+" symbol tagged onto the segment. The line segment tagged with a "+" extends from the first square in the 1 o'clock direction, thereby indicating that numeral 1 is the correct numeral per test form C. A line segment tagged with the "+" symbol extends from the second square 100' in the 3 o'clock direction, thereby indicating that numeral 3 is the correct number to be formed in that square, per form C. The correct answer for question 1. thus is confirmed as 13.

For questions 2. and 3., the directionally encoded line segments with the "+" symbol tagged on, confirm that 38 and 60 are the correct answers.

If test form A was identified at the bottom of sheet 104 as being the applicable form or answer key, then those line segments tagged with the "." symbol apply. The correct answers for questions 1., 2. and 3. then would be 73, 95 and 60. Note that the same numerals or answers can be clearly indicated as being the correct responses to certain questions in more than one test form. For example, for question 3., 60 is the correct answer in test forms A and C.

In cases where a respondent must generate an answer by writing one or more numerals or letters, flag symbols are used to designate the correct answer for a given form. The symbols "+", " ^ " and "." may be substituted by "a", "b" and "c" to correspond directly to test forms A, B and C. Further, clock positions do not always have to be used as referents to correct answers.

For example, if the respondent must generate answers in the form of letters rather than numbers, the letters T, B, L and R (top, bottom, left and right) can serve as a referent. In this case, the respondent would write one of these letters, selecting from options labeled T, B, L and R on a top sheet the lettered answer of choice. This arrangement saves space on the test papers, since writing one of four letters takes one-fourth the space required for four separate lettered area guides arranged in a row or column, only one of which is to be darkened as a selected choice.

Moreover, the referents can be printed on the scoring sheet, rather than be encoded by way of clock directions as in the foregoing embodiments. A common reference system such as a clock, compass or the like, is desirable only when there is a need to reduce clutter so as to make the meaning of multiple marks and flags readily interpretable.

FIGS. 5 and 6 show another embodiment of the present answer recording and score sheet device, by which a student can mark a numerical or other type of mathematical response (e.g., a "−" or a "+") to a test question, merely by marking a defined area or line extending next to the desired numeral or sign, on an answer guide 200. One or more of the guides 200 can be printed on the top surface of an answer sheet, next to numbers corresponding to a series of test questions. When the student computes the answer to each question, he or she simply marks over a guide line 202 that extends adjacent the computed number.

A scoring answer guide 200' is pre-printed on a scoring sheet attached beneath the answer sheet, out of view of the student, and in registration with the answer guide 200 on the answer sheet. As in the embodiments described above, visually discriminable symbols are positioned adjacent certain ones of scoring guide lines 202' associated with the scoring answer guide 200'. Each symbol represents one of a number (e.g., three) of different test forms or answer keys that may be implemented when grading the test.

Answering marks made by the student on the guide 200, are transferred by suitable means onto guide 200' while the scoring sheet is attached beneath the answer sheet. The grader is informed of the applicable test form or answer key by, for example, a marking made by the student under a "TEST FORM" heading (not shown in FIGS. 5 & 6) as in the foregoing embodiments, such marking also being transferred to a test form symbol identification area on the scoring sheet while attached beneath the answer sheet.

If test form C encoded by a "+" symbol applies, then the answer guide 200' in FIG. 6 shows that 1 is the correct answer. If test form A or B encoded respectively by the symbol "." or " ^ " applies, then 4 is the correct answer. Therefore, the test grader can easily verify if the student marked over the correct guide line 202 of the answer sheet guide 200, by seeing if a mark has been transferred onto a scoring guide line 202' that is flagged by the applicable test form symbol.

As explained further below, if a test is to be scored by electronic scanning, without the need for hand scoring at the test site, it is possible to use only a single sheet on which guides such as the guides 24 in FIG. 1 or the guides 200 in FIG. 5 are printed, to define areas or positions for response marks. In such case, the test form symbols would not be printed adjacent corresponding correct guides 24' or guide lines 202, but elsewhere on the sheet in a predetermined relation with the guides or guide lines, so as to provide an answer key that can be interpreted electronically for grading in accordance with a given test form.

When no hand scoring is to be performed, the answer mark guides disclosed herein can be printed only on that sheet of paper within the student's view. Guides that have until now never been used in either mark-sense scanning or in alpha-numeric scanning, such as the guides of FIGS. 5 and 6, can be used with the present answer/score sheet device. If the test is to be scored electronically only, without the need for hand-scoring by a grader, only one sheet is required and it is not necessary to print the applicable test form symbol adjacent the guide line which represents a correct answer. Instead, the test form symbol can be printed, for example, in a defined area at the top of the scannable sheet to provide the key or keys for interpreting the digitized information obtained from scanning of the student's marks. See FIG. 7.

For an answer sheet with mark sense positions a, b, c, d and e, as in FIG. 1, flag keys in the form of, for example, line segments inclined at 0, 20, 40, 60 and 80 degree angles relative to a horizontal reference may be used to code the correct answers to questions. The 0 degree flag can signify that answer (a) is correct, the 20 degree flag that (b) is correct, 40 degrees that (c) is correct, and so on. These flags can appear at any convenient place, such as the top of a page as in FIG. 7, as long as a rule is established for associating the flags with the test items. For example, the flags may be read from left to right, and from row one to row two, etc., thereby corresponding to the items row by row.

Since the flags may be visible to the respondent, it becomes necessary to disguise the answer key represented by the flags. Various encryption schemes may be used. For example, the 0 degree flag may represent answer (c), the 20 degree flag - (a), the 40 degree flag - (d), and so forth.

Alternatively, a scheme can be devised to indicate only the change in the correct answer for a given item, based on the key for the correct answer to the first item. Assume four choices are possible: 1, 2, 3, 4; and software is provided to instruct the computer to add a certain change value encoded on the sheet to the last correct answer. Then, if the last correct choice was "1", adding a change value of "1" would make "2" the next correct choice. If a change value of "3" was provided instead, then "4" would be the next correct choice. Note that a change value of "1" added to a previously correct "4" would make "1" the next correct answer, since in the instant example 1, 2, 3, 4 correspond to the four possible choices a, b, c, d. This scheme therefore can be used to encrypt correct choices for options labeled with letters.

In a more sophisticated and preferred embodiment, the first few flags are used to provide the computer with instructions concerning:

(1) the number of different test forms being coded and a read-start position for a first form, second form, etc., (2) a code number for any required encryption schemes, and corresponding computer sub-routines, (3) any "check" digits for providing recovery of information in case of "read/scan" errors, for example, for every group of five flags in accordance with commonly known error checking schemes in the telecommunications and computer fields, (4) the looking for 1's or 0's created by a digitizing scanner at particular memory locations corresponding to where correct and incorrect answers are stored in computer memory in correspondence with the image of the answer sheet, and (5) any other information specific to a particular application, such as how to score and report the test.

Ten flags formed by angles at 20 degree intervals from 0 to 180 degrees, may correspond, for example, to numerals 0, 1, 2, 3, . . . , 9 thereby packing a great deal of information into a small amount of space relative to binary, filled and unfilled circles and other heavy mark sense codes. Yet, since less resolution is required to detect the orientation of a line such as a slash (/) in two-dimensional space than is required for alphanumeric character resolution, a scanner/computer system adapted to use the information encoded by the flags of the present answer and score sheet device has the potential of operating as fast as a mark sense scanner, the latter only detecting white/black gradations on paper and, then, only for fairly sizable areas and relatively dark marks.

Since top/down and left/right orientations of a line segment with respect to a page are determined by coordinates of two end "points", any time lost in detecting those points by scanning at a greater resolution than that required to detect larger areas with mark sense scanners, would be more than recovered in certain applications by doing away with any keyboard inputting steps and not having to retrieve a particular test form and answer key from disk storage. The present device thus makes feasible the rapid scanning and scoring of different sheets of paper for different applications. A mix of answer sheets for different tests, questionnaires, remittance documents, insurance forms and the like, may be sent by a scanner to a computer without a special set-up being "installed" or brought into one or more memories for each application.

If information representing applicable keys and instructions is packed onto the first few lines of a sheet of paper, the scanner/computer combination needs only to discriminate and interpret these lines in a few small areas, while the print and blank spaces in about 70 percent of the sheet area can be ignored.

In FIG. 7, flag key line segments 300 are of equal lengths and form predetermined angles with a horizontal line defined by connecting squares 302. The squares 302 are point positions and origins, and may be of any other convenient shape. They may also vary, i.e., some square, some rectangular, some triangular, and are preferably placed at equal intervals along the horizontal. A student or other person responding to a test or questionnaire by entering marks at designated areas on another portion of the sheet not appearing in FIG. 7, would then be unable to decipher any answer key that might be encoded by way of the locations and orientations of the angled line segments 300. As discussed above, however, certain ones of the line segments 300 may by their angles identify correct answers for associated questions, while other segments 300 can provide operational computer information when read by a suitable scanner.

The present answer/score sheet device and technique may be used not only in testing, but also in a variety of other applications. The various flag, key and line segment indicia disclosed herein provide scoring information either to an individual grader or a scanner/computer apparatus, or both. Further, the indicia need not be in the form of commonly recognized alpha-numeric symbols.

The present device and technique can be used in testing, questionnaires, or any other application where an individual chooses a response either by darkening some defined area or by generating a letter or numeral. If darkening, the correct answer is indicated by the respondent within some designated area that has guide indicia for making appropriate marks. These areas or guides may be lettered and/or numbered in accord with the choices provided on the test, questionnaire, personal history, survey or whatever. There may be as few as one guide, or as many as is called for by a particular question or item when the respondent is to make marks or generate answers. The answer mark guide indicia need not be limited to circles or squares, but may include parallel line segments, diamonds, rectangles, and other defined areas.

In the disclosed embodiments, the guides which are printed on the top sheet to be viewed by the test taker, may also be reproduced on a page beneath, out of the test taker's view. The hidden page has flag lines, symbols and other key indicia to identify the correct answer for a given test form. These "hidden" indicia may also show the weight to be given a selected choice in the case of a questionnaire, and be enclosed in other guides or geometric figures. For example, a "=" may be enclosed by a circle, diamond or rectangle, and may be in a different color than the surrounding guide. Further, the transfer of the respondent's marks made on the top surface of the top page, can be made to the reverse side of the top page as well as to the top surface of the bottom page.

The flag lines, symbols and other key indicia used to identify the correct answer on the hidden page or sheet surface, need not necessarily be attached to the peripheries of the reproduced answer mark guides to indicate the proper response for a given test form as in FIG. 2. The answer identifying indicia may include graphics representing the correct answers on test forms coded by discriminable point elements such as "+", ".", "^", "*", wherein correct answers are composed of a number of those point elements to which the answers correspond. Also, the identifying indicia may simply be dashed or solid lines of various configurations, and/or be color coded.

On the hidden page or sheet surface, a selected answer mark guide may be flagged as correct by using any established reference system, for example; clock positions; the first, second, third and home positions of a baseball diamond; the positions of a compass by degrees or by North, South, East and West designations; or the top, bottom, left and right referents of a page. Any other reference system that can be communicated in instructions provided to the test scorer can be used, whether or not commonly known. In the embodiment of FIGS. 1 and 2, a clock referent is used on the hidden page surface to equate a marked test form number with the relative direction of a flag line attached to the periphery of a correct answer mark guide. In the FIGS. 3 and 4 embodiment, a clock referent is also used, but the 12 o'clock position is redefined as 0, and clock positions 10 and 11 are not used. In some instances, it may be desirable to print the referent's name, perhaps in a different color, next to the flags.

Since the initial designations of test forms may be transformed, for example, from Roman numerals or the letters of the alphabet, to Arabic numerals while keeping order invariant, it is always possible to employ a convenient reference system and a set of keys to flag the correct answer to a great number of different tests, using a single answer/scoring sheet device according to the invention. There can be, for example, Test Forms 1, 2, 3, 4, 5; I, II, III, IV; and A, B, C, D and E, all keyed with the same reference system and a common set of keys. The FIGS. 1 and 2 embodiment disclosed herein, which uses four directionally coded flag lines to provide an answer key, can be used as an answer/scoring sheet device for many different sets of test forms identified, for example, as 8, 9, 10 and 11; III, IV, V and VI; W, X, Y and Z, and forms A-1, B-1, C-1 and D-1. Thus, only a few different pre-printed answer/scoring sheet devices need be available for use with a great number of tests, making the present device particularly economical.

The top or bottom sheet may be provided in electronically scannable form, in accord with the technical requirements of so-called mark sense scanners that only interpret the relative darkness of darkened versus non-darkened areas, or other scanners that digitize at various levels on the gray scale and at various resolutions (e.g., 300, 600, 1000, etc. dots per inch H or V). The digitized information is interpreted by software as particular marks, characters, smudges or the like.

A third sheet of paper containing the above-described scannable form, can be attached in mark transfer relation to the other two sheets. The third, scannable sheet need not be glued or otherwise fastened on all four sides to the other two sheets. This would ensure that the physical properties of the scannable sheet are not affected when detached, so it could travel at high speed for electronic data processing.

The above-mentioned multi-part test/answer score sheet arrangement would provide students and teachers with immediate feedback of test results at the testing site, while a scoring and report center would prepare official results later.

In applications where students are asked both to generate written numerical or letter answers, and to select one or more response options from a number of possible choice answers, the answer mark guide indicia of all the embodiments disclosed herein, as well as any other conceivable guides, may be printed on the top page within the student's view. All reproduced guide indicia together with associated flags, symbols and other key indicia corresponding to known referents are then preprinted on the second page or bottom sheet surface, out of the student's view. Further, the second page can be scanned by digitizing scanners, and appropriate software can be used to score the test by interpreting the key indicia and the student's markings as transferred from the top page.

A distinct advantage to the use of scanners in interpreting the key indicia and transferred marks on the second page, as opposed to alpha-numeric image processing software, is speed. It takes far less time to scan and interpret marks than it does hand-made or printed alpha-numeric characters, regardless of the resolution of the scanner. Less than 300 line per inch resolution would be adequate, and interpretation of the marks and flags would be less error prone than in the corresponding alphanumeric character recognition arrangements. Moreover, the flags on the second page provide a computer directly with operating keys and thus obviate the need for looking up and finding keys in storage. This feature is important in saving time when, for example, the answer or top sheets themselves are used for different tests as is common in many test centers run by industrial firms and the military.

While the foregoing description represents preferred embodiments of the present invention, it will be obvious to those skilled in the art that various changes and modifications may be made, without departing from the spirit and scope of the invention.

What is claimed is:

1. An answer and score sheet device, comprising:
   markable sheet means having at least one surface with answer mark guide indicia on said surface, for defining first positions on said at least one surface at which marks can be made selectively by a respondent in response to corresponding questions; and
   said sheet means having a surface on which a number of discriminable flag indicia are formed at certain second positions in determined orientations with respect to said first positions, each of said flag indicia being identifiable with one of at least two different test forms;

wherein the formation of said flag indicia corresponds to correct responses to said questions in accordance with a selected one of the different test forms.

2. The answer and score sheet device of claim 1, wherein said markable sheet means comprises a top sheet and a bottom sheet, said top sheet having a visible surface with said answer mark guide indicia, said bottom sheet having a hidden surface on which said number of flag indicia are formed, and means for transferring answer marks made by the respondent in said answer mark guide indicia onto said hidden surface.

3. The answer and score sheet device of claim 2, wherein said answer mark guide indicia are reproduced on the hidden surface of said bottom sheet in registration with the guide indicia on the visible surface of said top sheet.

4. The answer and score sheet device of claim 1, wherein said markable sheet means comprises a single sheet.

5. The device of claim 2, wherein the top sheet and the bottom sheet have overlying margin borders detachably fastened to one another.

6. The device of claim 2, including a third sheet detachably fastened to said top and said bottom sheets, and means for transferring answer marks made by the respondent onto a surface of said third sheet to enable electronic grading of answers as designated by the respondent in the answer mark guide indicia on the top sheet.

7. An answer and score sheet device, comprising:
markable sheet means having at least one surface with answer mark guide indicia on said surface, for defining first positions on said at least one surface at which marks can be made selectively by a respondent in response to corresponding questions; and
said sheet means having a surface on which a number of discriminable flag indicia are formed at certain second positions different from said first positions, said flag indicia encoding correct responses for each of said questions according to a given test answer key;
wherein said flag indicia are oriented in a determined manner with respect to a given reference, and correct responses in said answer key can be decoded in accordance with the orientations of said flag indicia with respect to said reference.

8. The answer and score sheet device of claim 7, wherein said markable sheet means comprises a top sheet and a bottom sheet, said top sheet having a visible surface with said answer mark guide indicia, said bottom sheet having a hidden surface on which said number of flag indicia are formed, and means for transferring answer marks made by the respondent in said answer mark guide indicia onto said hidden surface.

9. The answer and score sheet device of claim 8, wherein said answer mark guide indicia are reproduced on the hidden surface of said bottom sheet in registration with the guide indicia on the visible surface of said top sheet.

10. The answer and score sheet device of claim 7, wherein said markable sheet means comprises a single sheet.

11. The device of claim 8, wherein the top sheet and the bottom sheet have overlying margin borders detachably fastened to one another.

12. A method of scoring designated responses to a series of questions, comprising:
forming answer mark guide indicia on a visible surface of markable sheet means, whereby responses to said questions can be designated by placing marks within selected ones of the answer mark guide indicia;
forming discriminable flag indicia on the sheet means at certain positions relative to the positions at which the answer mark guide indicia are printed on the sheet means;
equating the forms of the flag indicia with correct responses to said questions according to at least two different test forms;
discriminating the forms of the flag indicia from one another in a determined sequence; and
scoring the responses designated by said marks in accordance with the discriminated forms of said flag indicia and a selected one of the different test forms.

13. The method of claim 12, including equating each of the flag indicia with a corresponding one of the different test forms.

14. The method of claim 13, including positioning flag indicia equated with a given test form adjacent those answer mark guide indicia representing correct responses according to the given test form.

15. The method of claim 12, including arranging the answer mark guide indicia as open areas in which numbers or letters can be marked in response to said questions.

16. The method of claim 15, including encoding correct numerical or letter responses by orienting the flag indicia with respect to the answer mark guide indicia in a determined manner.

17. The method of claim 15, including decoding correct responses by referring to a reference symbol after establishing the orientations of said flag indicia.

18. The method of claim 17, including printing the reference symbol on the sheet means.

19. The method of claim 12, including performing said discriminating and scoring steps by electronically scanning said marks and said flag indicia.

20. A method of evaluating designated responses to a series of questions, comprising:
forming response mark guide indicia on a visible surface of markable sheet means, whereby responses to said questions can be designated by placing marks or writing characters within selected ones of the response mark guide indicia;
forming discriminable flag indicia on the sheet means;
defining a reference location on the sheet means;
selecting one of a number of different form response keys;
orienting the flag indicia on the sheet means with respect to said reference location according to a selected form response key; and
evaluating the responses by interpreting said marks or characters in accordance with the orientations of said flag indicia with respect to said reference location and the selected form response key.

21. The method of claim 20, including arranging the response mark guide indicia as open areas in which numbers or letters can be marked in response to said questions.

22. The method of claim 20, including printing the given reference in the form of a symbol on the sheet means.

23. The method of claim 20, including performing said evaluating step by optically scanning said marks or characters and said flag indicia.

* * * * *